United States Patent
Yoda et al.

(10) Patent No.: US 11,147,025 B2
(45) Date of Patent: Oct. 12, 2021

(54) ELECTRONIC APPARATUS AND METHOD

(71) Applicant: KABUSHIKI KAISHA TOSHIBA, Tokyo (JP)

(72) Inventors: Daiki Yoda, Yokohama Kanagawa (JP); Koji Akita, Yokohama Kanagawa (JP); Daisuke Uchida, Kawasaki Kanagawa (JP); Tamio Kawaguchi, Kawasaki Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 117 days.

(21) Appl. No.: 16/558,547

(22) Filed: Sep. 3, 2019

(65) Prior Publication Data
US 2020/0229108 A1  Jul. 16, 2020

(30) Foreign Application Priority Data
Jan. 15, 2019 (JP) .............................. JP2019-004737

(51) Int. Cl.
H04W 52/24 (2009.01)
H04W 52/26 (2009.01)
H04L 5/14 (2006.01)

(52) U.S. Cl.
CPC .......... H04W 52/243 (2013.01); H04L 5/143 (2013.01); H04W 52/246 (2013.01); H04W 52/262 (2013.01)

(58) Field of Classification Search
CPC ............. H04W 52/243; H04W 52/262; H04W 52/246; H04W 52/16; H04L 5/143
See application file for complete search history.

(56) References Cited

U.S. PATENT DOCUMENTS

| | | | |
|---|---|---|---|
| 6,256,476 B1 * | 7/2001 | Beamish | H04W 52/283 340/7.36 |
| 2012/0250526 A1 * | 10/2012 | Zhao | H04B 7/2606 370/243 |
| 2014/0106686 A1 * | 4/2014 | Higgins | H04L 5/16 455/78 |
| 2015/0109969 A1 | 4/2015 | Celebi et al. | |
| 2015/0229461 A1 * | 8/2015 | DiFazio | H04L 5/14 370/280 |
| 2019/0165822 A1 * | 5/2019 | Chen | H04B 1/12 |
| 2019/0173709 A1 * | 6/2019 | Baek | H04L 5/0007 |

FOREIGN PATENT DOCUMENTS

| | | |
|---|---|---|
| JP | 2016539552 A | 12/2016 |
| JP | 6109423 B2 | 3/2017 |

* cited by examiner

*Primary Examiner* — Mohammad S Anwar
(74) *Attorney, Agent, or Firm* — Holtz, Holtz & Volek PC

(57) ABSTRACT

According to one embodiment, an electronic apparatus includes receiver circuitry, transmitter circuitry, and processor circuitry. The receiver circuitry receives a first signal including first data via a first frequency band. The transmitter circuitry starts transmission of a second signal via at least a part of the first frequency band. The processor circuitry reduces interference caused by the second signal to receive the first signal. The processor circuitry increases a power of the second signal until reducing the interference becomes stable for the first time since the transmitter circuitry has started transmission of the second signal.

22 Claims, 11 Drawing Sheets $D_R$ : Resource element including data
$P_R$ : Resource element including known symbol (pilot)

Frequency band → 1 2 3 4 5 6 7 8 9 10

| | 1 | 2 | 3 | 4 | 5 | 6 | 7 | 8 | 9 | 10 |
|---|---|---|---|---|---|---|---|---|---|---|
| 1 | N | N | N | N | N | N | N | N | N | N |
| 2 | N | N | $P_T$ | N | N | N | N | $P_T$ | N | N |
| 3 | N | N | N | N | N | N | N | N | N | N |
| 4 | N | N | N | N | N | N | N | N | N | N |
| 5 | N | N | N | N | N | N | N | N | N | N |
| 6 | N | N | $P_T$ | N | N | N | N | $P_T$ | N | N |
| 7 | N | N | N | N | N | N | N | N | N | N |
| 8 | N | N | N | N | N | N | N | N | N | N |

N : Empty resource element
$P_T$ : Resource element including known symbol (pilot)

FIG. 5

| | 1 | 2 | 3 | 4 | 5 | 6 | 7 | 8 | 9 | 10 |
|---|---|---|---|---|---|---|---|---|---|---|
| 1 | N | N | $P_T$ | N | N | N | N | $P_T$ | N | N |
| 2 | $P_T$ | $P_T$ | $P_T$ | $P_T$ | $P_T$ | $P_T$ | $P_T$ | $P_T$ | $P_T$ | $P_T$ |
| 3 | N | N | $P_T$ | N | N | N | N | $P_T$ | N | N |
| 4 | N | N | $P_T$ | N | N | N | N | $P_T$ | N | N |
| 5 | N | N | $P_T$ | N | N | N | N | $P_T$ | N | N |
| 6 | $P_T$ | $P_T$ | $P_T$ | $P_T$ | $P_T$ | $P_T$ | $P_T$ | $P_T$ | $P_T$ | $P_T$ |
| 7 | N | N | $P_T$ | N | N | N | N | $P_T$ | N | N |
| 8 | N | N | $P_T$ | N | N | N | N | $P_T$ | N | N |

N : Empty resource element
$P_T$ : Resource element including known symbol (pilot)

FIG. 6

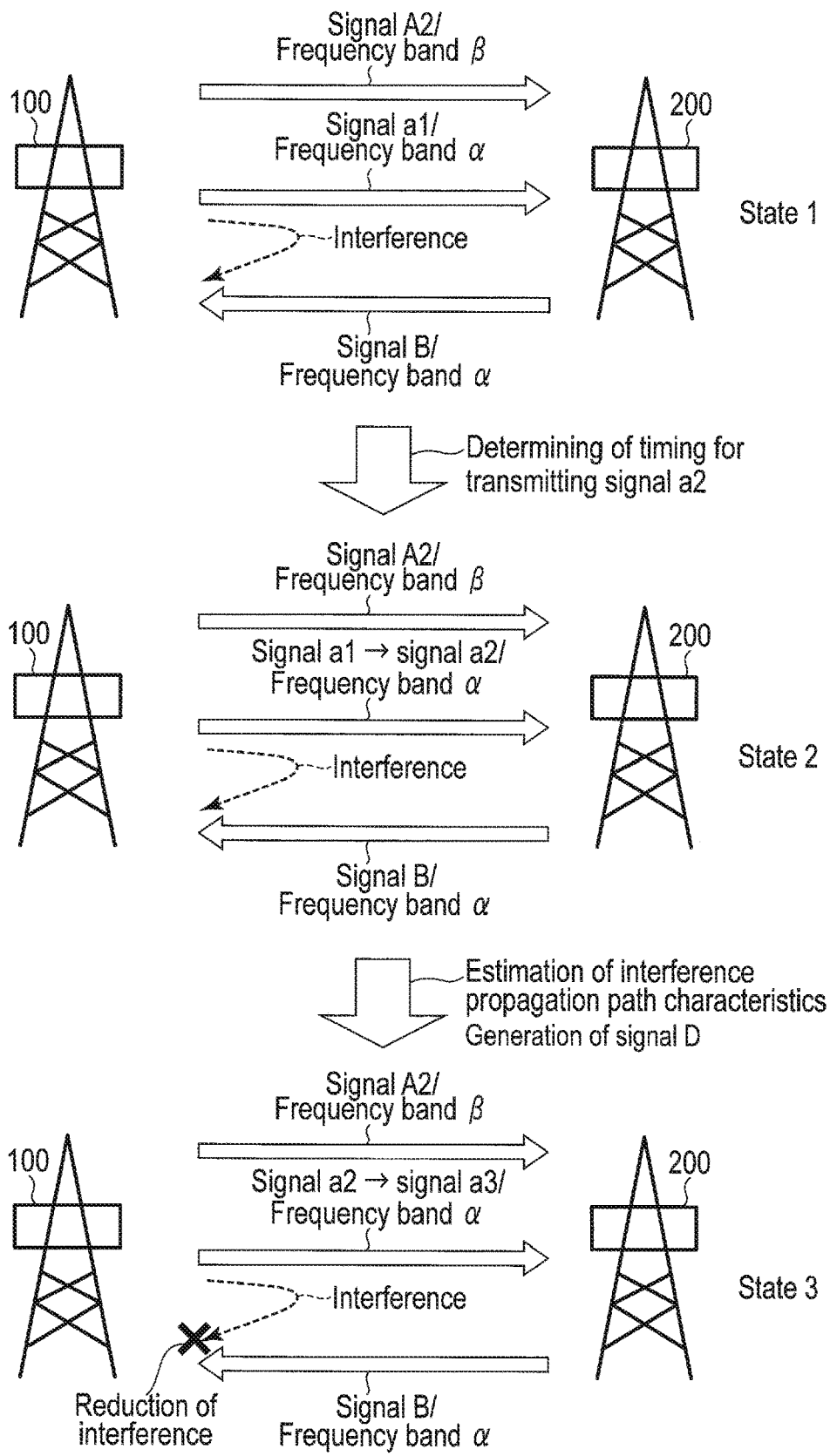
F I G. 8

ELECTRONIC APPARATUS AND METHOD

CROSS-REFERENCE TO RELATED APPLICATIONS

This application is based upon and claims the benefit of priority from Japanese Patent Application No. 2019-004737, filed Jan. 15, 2019, the entire contents of which are incorporated herein by reference.

FIELD

Embodiments described herein relate generally to an electronic apparatus and a method related to full-duplex communication for transmitting a signal while receiving a signal in the same frequency band.

BACKGROUND

Full-duplex communication technology for performing transmission and reception via the same frequency band has been developed. To communicate more data without causing a communication breakdown, there is demand for a wireless communication device which can perform full-duplex communication. The wireless communication device starts, while performing reception by Frequency Division Duplex (FFD), transmission of a signal in a frequency band including the same frequency band as that of the reception, and performs the transmission of the signal while performing the reception of the signal in the same frequency band.

BRIEF DESCRIPTION OF THE DRAWINGS

FIG. 5 is an exemplary diagram showing a structure of a signal a1 transmitted in the same frequency band as the signal B.

FIG. 6 is an exemplary diagram showing a structure of a signal a2 transmitted in the same frequency band as the signal B.

FIG. 8 is an exemplary diagram showing a state transition of the wireless communication devices 100 and 200 after the start of full-duplex communication of the wireless communication device 100 of FIG. 2.

DETAILED DESCRIPTION

Figure 1:
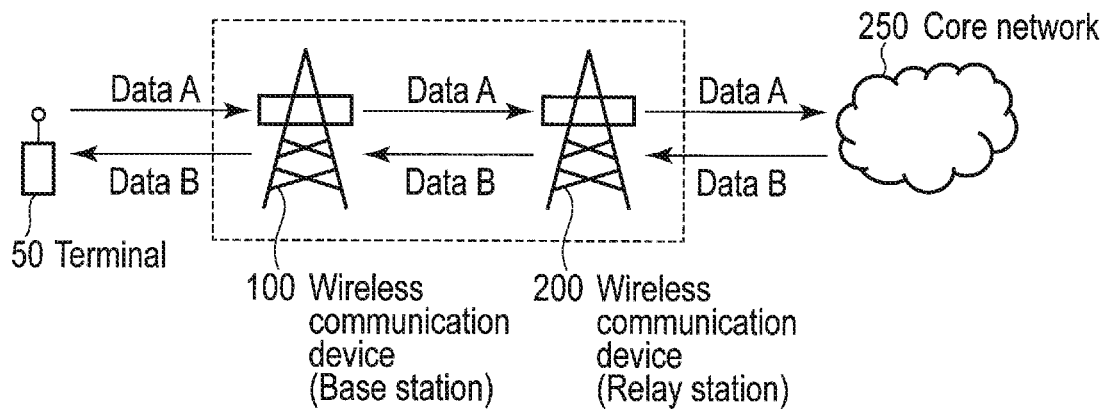
FIG. 1 is an exemplary diagram showing a wireless communication system according to the first embodiment.

Various embodiments will be described hereinafter with reference to the accompanying drawings.

The disclosure is merely an example and is not limited by contents described in the embodiments described below. Modification which is easily conceivable by a person of ordinary skill in the art comes within the scope of the disclosure as a matter of course. In order to make the description clearer, the sizes, shapes, and the like of the respective parts may be changed and illustrated schematically in the drawings as compared with those in an accurate representation. Constituent elements corresponding to each other in a plurality of drawings are denoted by like reference numerals and their detailed descriptions may be omitted unless necessary.

In general, according to one embodiment, an electronic apparatus includes receiver circuitry, transmitter circuitry, and processor circuitry. The receiver circuitry is configured to receive a first signal including first data via a first frequency band. The transmitter circuitry is configured to start transmission of a second signal via at least a part of the first frequency band while the receiver circuitry is receiving the first signal. The processor is configured to reduce interference caused by the second signal to receive the first signal. The processor is configured to increase a transmission power of the second signal until reducing the interference becomes stable for the first time since the transmitter circuitry has started transmission of the second signal.

First Embodiment

FIG. 1 is a diagram showing an example of an electronic apparatus according to the first embodiment. Data A generated in a terminal 50 is transmitted from the terminal 50 to a core network 250 via wireless communication devices 100 and 200. In addition, data B transmitted from the core network 250 to the terminal 50 is transmitted from the core network 250 to the terminal 50 via the wireless communication devices 200 and 100. Here, the wireless communication terminal 100 is a base station which can communicate with the terminal 50. While the wireless communication device 100 performs communication of the data A and the data B with the wireless communication device 200, the wireless communication device 100 communicates with the terminal 50. The wireless communication device 200 is a relay station which relays communication between the wireless communication device 100 and the core network 250.

While the wireless communication device 200 performs communication of the data A and the data B with the wireless communication device 100, the wireless communication device 200 receives the data B from the core network 250 and transmits the data A to the core network 250.

Figure 2:
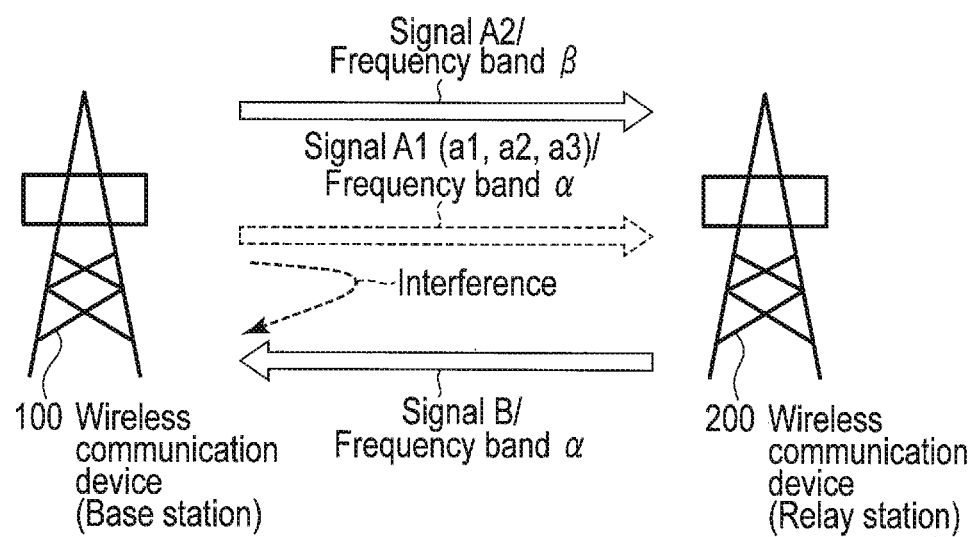
FIG. 2 is an explanatory diagram showing an example of signals A and B between a wireless communication device 100 and a wireless communication device 200 of FIG. 1.

FIG. 2 is a diagram showing communication between the wireless communication devices 100 and 200 according to the present embodiment. It is assumed that the communication between the wireless communication devices 100 and 200 is performed by Frequency Division Duplex via frequency bands α and β.

In addition, while performing Frequency Division Duplex communication with the wireless communication device 200, the wireless communication device 100 receives the data A from the terminal 50 and transmits the data B to the terminal 50 in a frequency band different from the frequency bands α and β. In this communication, it is assumed that interference reduction is appropriately performed. While performing Frequency Division Duplex communication with the wireless communication device 100, the wireless communication device 200 receives the data B from the core network 250 and transmits the data A to the core network 250 in a frequency band different from the frequency bands α and β. In this communication also, it is assumed that interference reduction is appropriately performed.

That is, to be more specific about the communication between the wireless communication devices 100 and 200, the wireless communication device 100 transmits a signal A2 via the frequency band β to the wireless communication device 200. The data A received from the terminal 50 is included in the signal A2. On the other hand, the wireless communication device 200 transmits a signal B via the frequency band a to the wireless communication device 100. The data B received from the core network 250 is included in the signal B.

According to the present embodiment, the wireless communication device 100 starts full-duplex communication while performing Frequency Division Duplex communication with the wireless communication device 200. The full-duplex communication is communication for transmitting a signal while receiving a signal in the same frequency band. More specifically, while the wireless communication device 100 receives the signal B, if the level of quality of the signal B is a particular level or higher, the wireless communication device 100 starts transmitting a signal A1 via the frequency band α which the wireless communication device 100 is currently using for receiving the signal B. That is, the transmission of the signal A1 by the wireless communication device 100 and the transmission of the signal B by the wireless communication device 200 are simultaneously performed in the frequency band α. The full-duplex communication can improve the transmission speed of the data A which the wireless communication device 100 transmits.

As the wireless communication device 100 transmits the signal A1, the signal A1 interferes with the signal B. Therefore, the wireless communication device 100 first sets the power of the signal A1 to such a low power that does not influence with demodulation of the signal B into the data B, estimates the interference propagation path characteristics of the interference from the signal A1 to the signal B, i.e., the interference of the signal A1 in the signal B, or the interference caused by the signal A1 to receive the signal B, generates a signal which reduces the interference, and reduces the interference. The wireless communication device 100 continues the processing for reducing the interference, and if the quality of the signal B is improved to a particular level or higher, increases the transmission power of the signal A1.

In addition, it is assumed that the wireless communication devices 100 and 200 have been authenticated for full-duplex communication in advance.

The wireless communication device 100 receives the signal B interfered by the signal A1 (hereinafter referred to as a signal C) after the start of transmission of the signal A1. The wireless communication device 100 generates a signal which processes the interference of the signal A1 in the signal C and reduces the interference of the signal A1 in the signal C. The wireless communication device 100 determines the signal quality of the signal C where the interference has been processed, and controls the transmission power of the signal A1 based on the result of the determination. Consequently, full-duplex communication can be started while Frequency Division Duplex communication is being performed.

Figure 3:
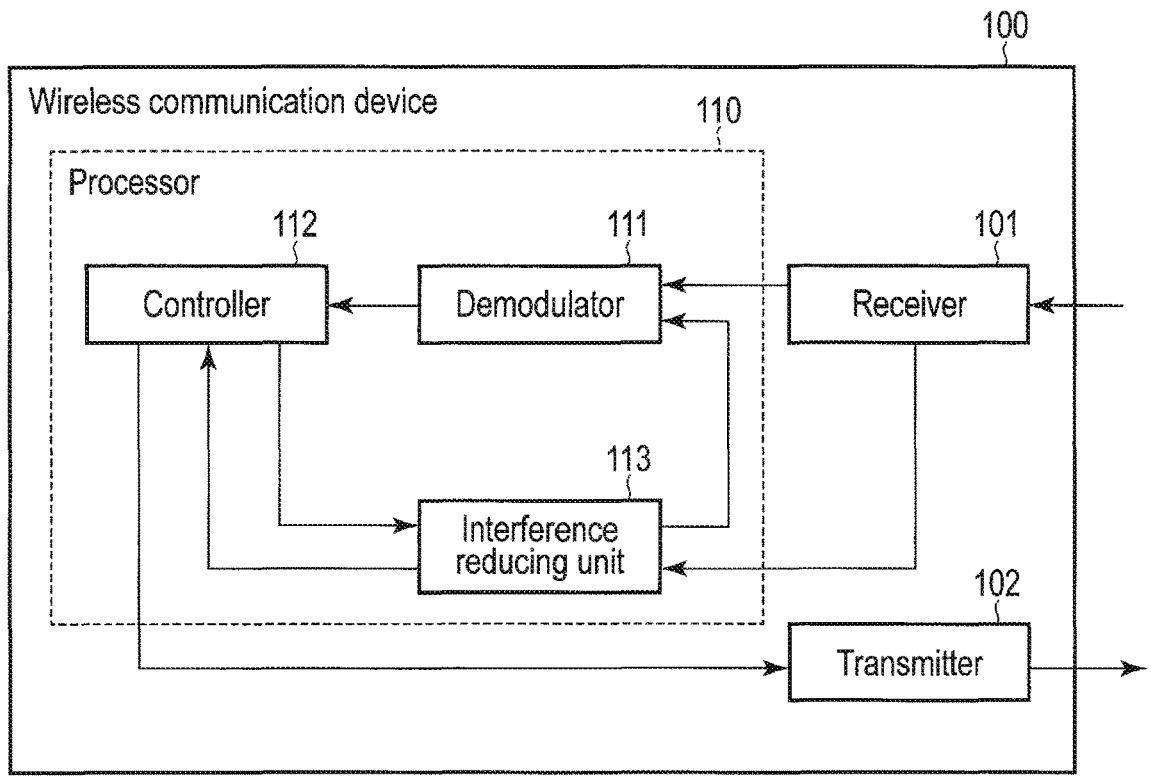
FIG. 3 is an exemplary diagram showing a configuration of the wireless communication device 100 of FIG. 1.

The configuration of the wireless communication device 100 will be described with reference to FIG. 3. The wireless communication device 100 comprises a processor 110, a receiver 101, and a transmitter 102. The processor 110 comprises a demodulator 111, a controller 112, and an interference reducing unit 113.

The receiver 101 receives a signal directed to the wireless communication device 100. For example, the wireless communication device 100 receives a signal including the data A from the terminal 50 (hereinafter referred to as a signal A0), the signal B, and the signal C interfered by the signal A1 from the wireless communication device 200. These signals are transmitted to the demodulator 11. In addition, the signal C is also transmitted to the interference reducing unit 113 and is used for estimation of the interference propagation path characteristics of the signal A1 which interferes with the signal B (hereinafter referred to as interference propagation path characteristics $I_{A1}$). The receiver 101 comprises an antenna and receives these signals.

The demodulator 111 demodulates signals. The data A is demodulated from the signal A0. Before the full-duplex communication starts, the signal B is transmitted from the receiver 101 to the demodulator 111, and the demodulator 111 demodulates the signal B into the data B. After the full-duplex communication has started, the signal C is transmitted from the receiver 101 to the demodulator 111. Although the signal C is interfered by the signal A1, since the interference is such low interference that does not influence the reception and the demodulation, the demodulator 111 demodulates the signal C into the data B. In addition, the demodulator 111 calculates indexes indicative of the qualities of the received signals B and C. The indexes indicative of the qualities of the received signals are transmitted to the controller 112 and are used for determination of the powers of signals which the transmitter 102 transmits. Examples of the index indicative of the quality of the received signal are a cyclic redundancy check (CRC), a signal to noise ratio (SNR), an error vector magnitude (EVM) and the like. In addition, the demodulator 111 transmits the data demodulated from the signals to the controller 112. These data are used for generation of signals to be transmitted from the controller 112.

The controller 112 modulates the data demodulated by the demodulator 111 and transmits the data to the transmitter 102 as signals. The data A is transmitted as the signal A1 or A2 to the wireless communication device 200, and the data B is transmitted as a signal to the terminal 50 (hereinafter referred to as a signal B0). In addition, the controller 112 determines the powers for transmitting the signals to be transmitted based on the indexes of the qualities of the signals transmitted from the demodulator 111, and transmits information indicative of the powers to the transmitter 102. Furthermore, the controller 112 transmits the signal A1 to be transmitted in full-duplex communication to the interference reducing unit 113. The signal A1 is used for generation of a signal which reduces the interference of the signal A1 in the signal C which the receiver 101 received (hereinafter referred to as a signal D).

The interference reducing unit 113 estimates the interference propagation path characteristics $I_{A1}$. Since the wireless communication devices 100 and 200 have been authenticated for full-duplex communication in advance, the interference reducing unit 113 recognizes known symbols (may be called pilots) included in the signal B and known symbols included in the signal A1. The interference propagation path characteristics $I_{A1}$ are estimated from these known symbols and the signal C transmitted from the receiver 101. In addition, the interference reducing unit 113 generates the signal D from the interference propagation path characteristics $I_{A1}$ and the signal A1 transmitted from the controller 112, and reduces the interference of the signal A1 in the signal C which the receiver 101 has received.

The transmitter 102 transmits the signals transmitted from the controller 112 at the powers determined by the controller 112. In the case of the signal A1 or A2, the transmitter 102 transmits the signal to the wireless communication 200. In the case of the signal B0, the transmitter 102 transmits the signal to the terminal 50. The transmitter 102 comprises an antenna and performs the transmission of these signals.

The wireless communication device 100 is assumed to be a base station in the present embodiment but may be realized as a circuit such as an LSI. In addition, regarding the configuration of the wireless communication device 100, independent constituent elements may be connected to each other or some constituent elements may be integrated in a chip, etc.

Next, the structures of the signals which the wireless communication devices 100 and 200 communicate in full-duplex communication will be described. These signals are assumed to be communicated in the frequency band α.

Figure 4:
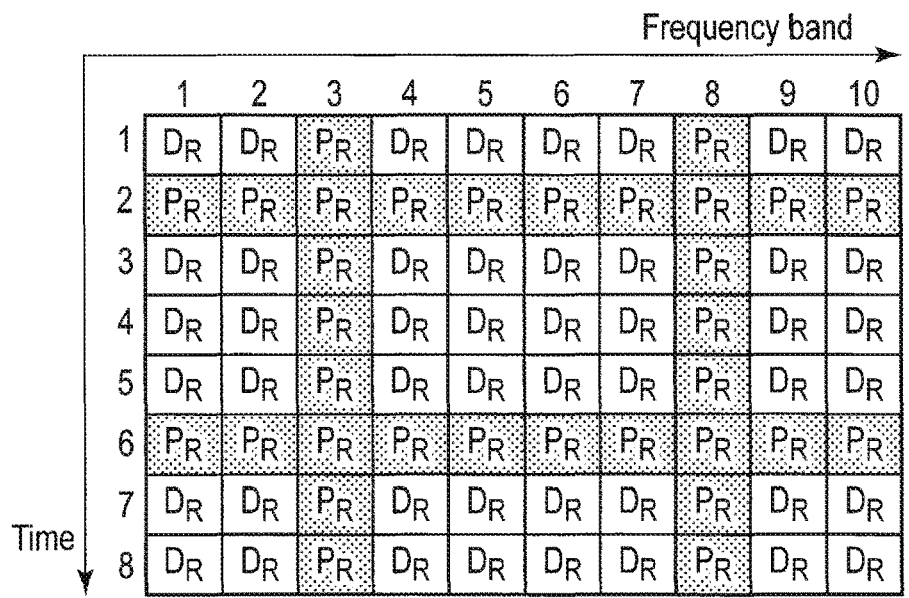
FIG. 4 is an exemplary diagram showing a structure of the signal B of FIG. 2.

The structure of the signal B which the wireless communication device 200 transmits and the wireless communication device 100 receives will be described with reference to FIG. 4. In FIG. 4, either data or a known symbol is assigned to each of resource elements delimited by a time and a frequency band. $D_R$ represents a resource element including the data B and $P_R$ represents a resource element including a known symbol. According to the present embodiment, the wireless communication devices 100 and 200 have been authenticated for full-duplex communication in advance. Therefore, the wireless communication devices 100 and 200 have already shared information about $P_R$ with each other. On the other hand, $D_R$ represents an element unknown to the wireless communication device 100.

Figure 7:
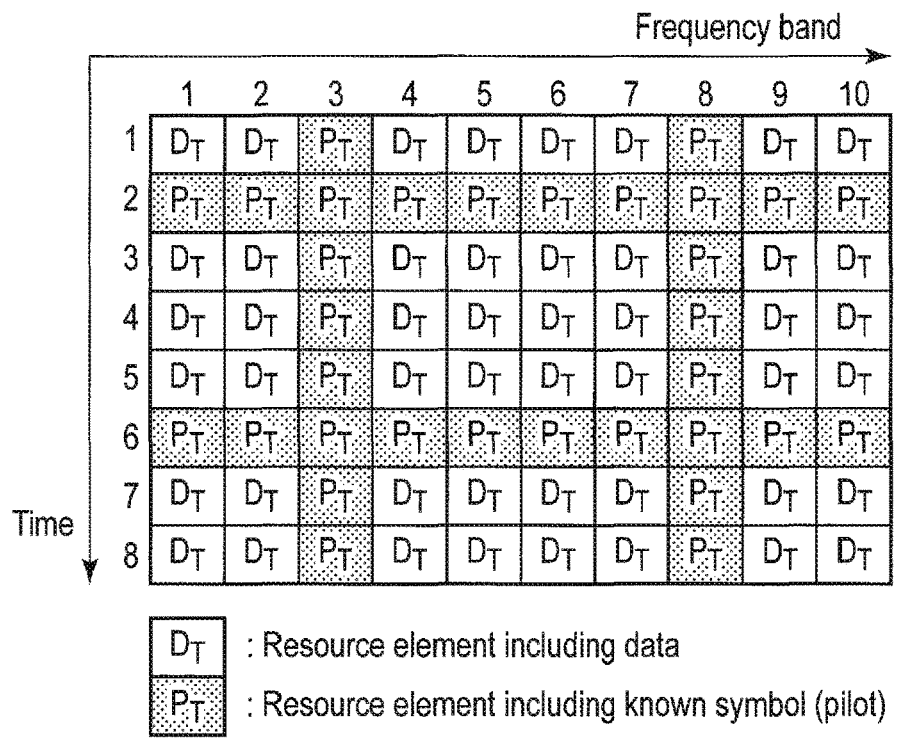
FIG. 7 is an exemplary diagram showing a structure of a signal a3 transmitted in the same frequency band as the signal B.

The structure of the signal A1 which the wireless communication device 100 transmits to the wireless communication device 200 will be described with reference to FIGS. 5 to 7. According to the present embodiment, signals a1, a2, and a3 are sequentially transmitted to the wireless communication device 200 as the signal A1. The signal a1 is a signal for matching a timing to the signal B so that a symbol timing of the signal a1 matches a symbol timing of the signal B, and does not include the data A to be transmitted to the wireless communication device 200. The signal a2 is a signal for estimating the interference propagation path characteristics $I_{A1}$, and does not include the data A to be transmitted to the wireless communication device 200. The interference propagation path characteristics $I_{A1}$ estimated by using the signal a2 can be applied to the interference of each of the signals a1, a2, and a3 in the signal B. The signal a3 is a signal including a part of the data A received from the terminal 50, and transmits the part of the data A to the wireless communication device 200. It is possible to match the transmission timing of the signal a2 and the transmission timing of the signal a3 by matching the known symbol of the signal B and a non-null element of the signal a1.

Although the signal B interfered by the signal A1 has been referred to as the signal C, the signal C will be hereinafter used as a general term for signals c1, c2, and c3. That is, the signal B interfered by the signal a1 will be referred to as the signal c1, the signal B interfered by the signal a2 will be referred to as the signal c2, and the signal B interfered by the signal a3 will be referred to as the signal c3.

First, the structure of the signal a1 will be described with reference to FIG. 5. In the signal a1, known symbols $P_T$ are assigned to specific resource elements and the remaining resource elements are empty (N). According to the present embodiment, the wireless communication devices 100 and 200 have been authenticated for full-duplex communication in advance. Therefore, the wireless communication devices 100 and 200 have already shared the information about $P_T$. When the controller 112 generates the signal a1 and the transmitter 102 transmits the signal a1, the receiver 101 receives the signal c1. The signal a1 is used for determining of the timing for transmitting the signal a2 by the controller 112. According to the present embodiment, the number of known symbols $P_T$ of the signal a1 is assumed to be less than the number of known symbols $P_R$ of the signal B.

The structure of the signal a2 will be described with reference to FIG. 6. In the signal a2, known symbols $P_T$ are assigned to the same resource elements to which the known symbols of the signal B are assigned and the remaining resource elements are empty. When the controller 112 generates the signal a2 and the transmitter 102 transmits the signal a2, the receiver 101 receives the signal c2. The signal a2 is used for estimation of the interference propagation path characteristics $I_{A1}$ by the interference reducing unit 113. According to the present embodiment, the number of known symbols $P_T$ of the signal a2 is equal to the number of known symbols $P_R$ of the signal B. As long as information such as the contents, numbers, and positions of $P_T$ and $P_R$ are shared between the wireless communication device 100 and the wireless communication device 200, the number of known symbols $P_T$ and the number of known symbols $P_R$ are not necessarily equal to each other.

The structure of the signal a3 will be described with reference to FIG. 7. In the signal a3, the empty resource elements of the signal a2 are replaced with resource elements $D_T$ containing the data A. When the transmitter 102 transmits the signal a3, the receiver receives the signal c3. The signal a3 is used for transmitting a part of the data A to the wireless communication device 200.

Although the signal a3 can be transmitted from the transmitter 102 from the beginning, when the signal a2 is used for estimation of the interference propagation path characteristics $I_{A1}$, the interference of the signal which the transmitter 102 transmits in the signal B can be further reduced. In addition, although the signal a1 is not necessarily used for determining of the timing for transmitting the signal a2, when the signal a1 is used, the interference of the signal which the transmitter 102 transmits in the signal B can be further reduced.

The overview of the relationship between the wireless communication devices 100 and 200 after the start of simultaneous signal transmission and signal reception via the frequency band α will be described with reference to the state transition diagram of FIG. 8.

First, the transmitter 102 starts full-duplex communication in the frequency band α using the signal a1 (state 1). The controller 112 can determine the timing for transmitting the signal a2 from the signal c1 interfered by the signal a1, and the signal a1.

After the controller 112 has determined the timing for transmitting the signal a2, the transmitter 102 switches the transmission signal from the signal a1 to the signal a2 (state 2). The interference reducing unit 113 can estimate the interference propagation path characteristics $I_{A1}$ from the signal c2 interfered by the signal a2, and the signal a2. The interference reducing unit 113 can generate the signal D using the interference propagation path characteristics $I_{A1}$.

After the reduction of the interference of the signal a2 in the signal c2 has progressed by the interference reducing unit 113, the transmitter 102 switches the transmission signal from the signal a2 to the signal a3, and the data A is transmitted to the wireless communication device 200 also in the frequency band α. The interference reducing unit 113 continues the processing for reducing the interference in the signal c3 interfered by the signal a3.

The overview has been described above. Next, the operation of the wireless communication device 100 will be described. In the description of the operation, an operation related to the wireless communication device 200 at the other end of the full-duplex communication will be described, and an operation related to the terminal 50 will not be described as a flow since the flow is common to the operations related to the wireless communication device 200 and the terminal 50.

Figure 9:
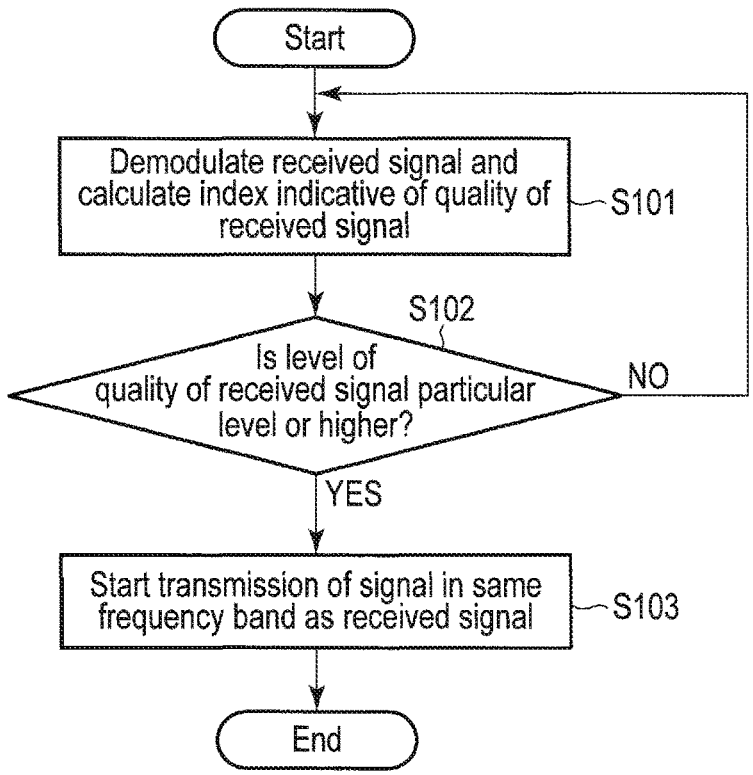
FIG. 9 is an exemplary diagram showing a flow chart until the start of full-duplex communication of the wireless communication device 100 of FIG. 3.

First, the operation until the time when the wireless communication device 100 starts full-duplex communication with the wireless communication device 200 will be described with reference to FIG. 9. It is assumed that the wireless communication devices 100 and 200 perform Frequency Division Duplex communication in the frequency bands α and β as shown in FIG. 2. That is, the wireless communication device 100 receives the signal B from the wireless communication device 200 via the frequency band α. In addition, the wireless communication device 100 transmits the signal A2 to the wireless communication device 200 via the frequency band β. Furthermore, the wireless communication device 100 also communicates with the terminal 50 in a frequency band other than the frequency bands α and β, receives the signal A0, and transmits the signal B0. It is assumed that interference related to the reception of the signal A0 is appropriately reduced.

First, the demodulator 111 demodulates the signal B which the receiver 101 has received, and calculates an index indicative of the quality of the signal B (step S101). The demodulator 111 uses index such as a CRC, an SNR or an EVM as the index indicative of the quality of the signal. It is possible to determine the quality of the signal by combining these indexes. The calculation result of the index is transmitted to the controller 112. In addition, the result of demodulation of the signal B is transmitted as the data B to the controller 112. The controller 112 modulates the data B into the signal B0, and transmits the signal B0 to the terminal 50 through the transmitter 102.

Next, the controller 112 determines whether the level of quality of the signal B is a particular level or higher from the calculation result of the index transmitted from the demodulator 111 (step S102). The controller 112 can arbitrarily set a threshold value for determining whether the level of quality of the signal B is the particular level or higher and may set a plurality of threshold values to determine the level of quality of the signal B by combining indexes such as a CRC, an SNR and an EVM. Alternatively, the controller 112 may determine whether the number of errors of the signal B is a particular number or less instead of determining whether the level of quality of the signal B is the particular level or higher. In addition, the controller 112 may determine whether the level of quality of the signal B has been a particular level or higher continuously for a particular time. This particular time is set by the controller 112. If the controller 112 determines that the level of quality of the signal B is not the particular level or higher (step S102: No), the flow returns to step S101.

On the other hand, if the controller 112 determines that the level of quality of the signal B is the particular level or higher (step S102: Yes), the transmitter 102 starts transmission of the signal a1 via the frequency band α and starts full-duplex communication with the wireless communication device 200 (step S103). As the transmitter 102 transmits the signal a1, the receiver 101 receives the signal c1. At this time, the power for transmitting the signal a1 is P1 and is such a low power that does not influence the demodulation from the signal c1 into the data B by the demodulator 111. Note that, although the signal B interfered by the signal a1 is referred to as the signal c1 for purposes of explanation, the power P1 for transmitting the signal a1 is such a low power that does not influence the demodulation from the signal c1 to the data B. Therefore, the signal B and the signal c1 are substantially the same.

The wireless communication devices 100 and 200 start full-duplex communication in the manner described above.

Next, the operation of the wireless communication device 100 after the start of the full-duplex communication will be described with reference to FIGS. 10A, 10B, and 11. Note that the wireless communication device 100 continuously receives the signal B from the wireless communication device 200 via the frequency band α. In addition, the wireless communication device 100 transmits the signal A2 to the wireless communication device 200 via the frequency band β. Furthermore, the wireless communication device 100 communicates with the terminal 50 in a frequency band other than the frequency bands α and β, receives the signal A0, and transmits the signal B0. It is assumed that interference related to the reception of the signal A0 is appropriately reduced.

Figure 10A:
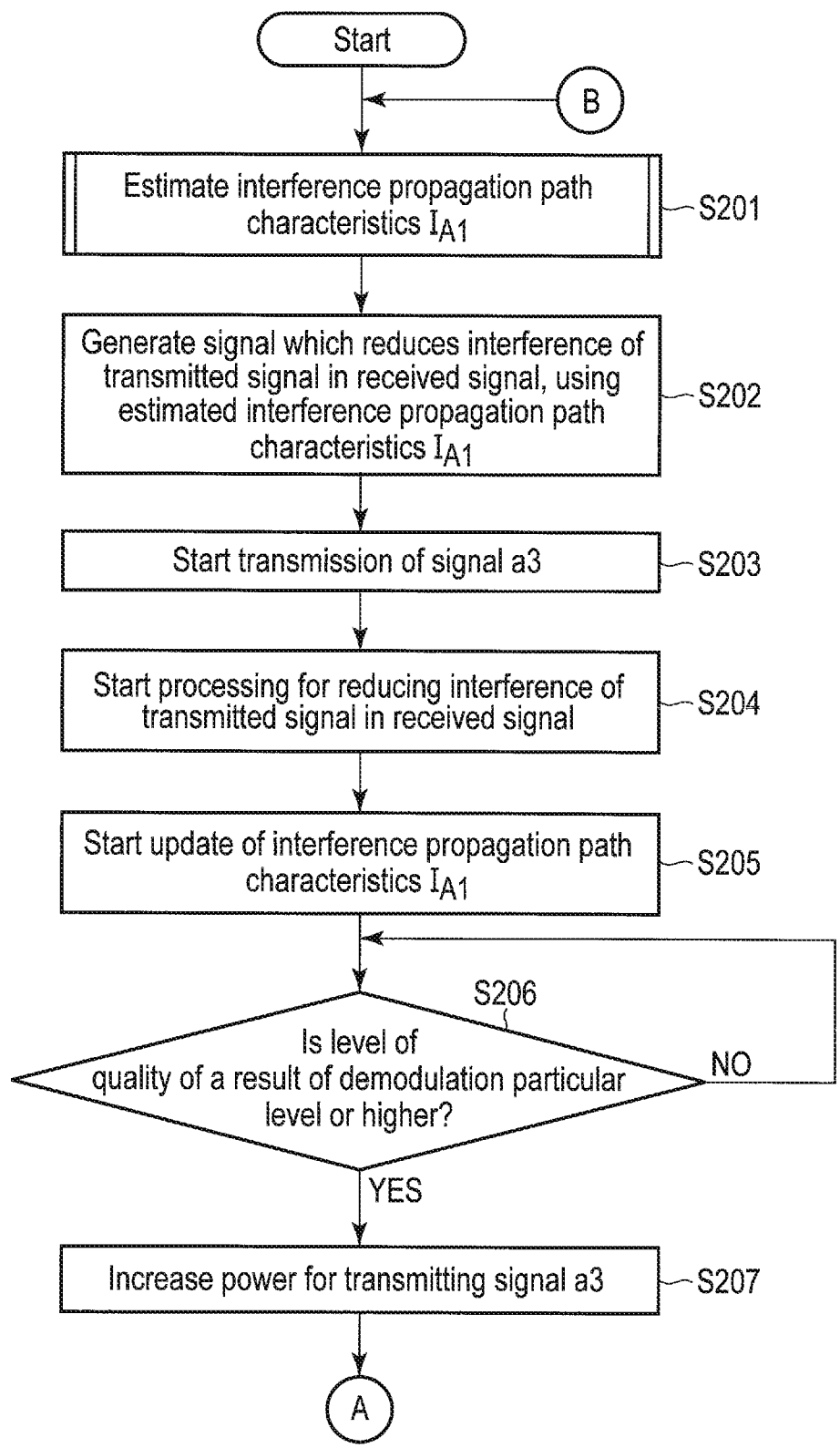
FIG. 10A is an exemplary diagram showing the first half of a flow chart after the start of full-duplex communication of the wireless communication device 100 of FIG. 3.

First, as the operation of the wireless communication device 100, the estimation of the interference propagation path characteristics $I_{A1}$ is performed (step S201 in FIG. 10A). The operation of the wireless communication device 100 in the estimation of the interference propagation path characteristics $I_{A1}$ will be described with reference to FIG. 11. Since the transmitter 102 has started transmission of the signal a1, the signal B is interfered by the signal a1. That is, the receiver 101 receives the signal c1. The signal c1 is transmitted to the demodulator 111 and the interference reducing unit 113. Since the signal c1 is only subjected to such low interference that does not influence the demodulation into the data B, the signal c1 is demodulated into data B in the demodulator 111, and the index indicative of the quality of the signal is calculated. As it is done before the start of the full-duplex communication, the demodulated data B is modulated into the signal B0 in the controller 112 and the signal B0 is transmitted to the terminal 50 through the transmitter 102.

First, the interference reducing unit 113 determines the timing for transmitting the signal a2 from the signal c1 transmitted from the receiver 101 and the information about the known symbols $P_R$ of the signal B and the known symbols $P_T$ of the signal a1 which have been recognized in advance (step S301). More specifically, among the resource elements to which the known symbols $P_R$ of the signal B are assigned, some resource elements of the signal B are not the known symbols $P_R$ any more due to the interference of the known symbols $P_T$ (this signal is referred to as the signal c1). The interference reducing unit 113 determines the timing for transmitting the signal a2 from the positions of these resource elements. Information indicative of the timing is transmitted to the controller 112.

Next, the controller 112 instructs the transmitter 102 to start transmission of the signal a2 in place of the signal a1 at the timing determined by the interference reducing unit 113, and the transmitter 102 starts transmission of the signal a2 in place of the signal a1 according to the instruction of the controller 112 (step S302). Here, since the signal B is interfered by the signal a2, the receiver 101 receives the signal c2. At this time, a power P2 for transmitting the signal a2 is, as is the case with the power P1, such a low power that does not influence the demodulation from the signal c2 into the data B by the demodulator 111. As long as the power P2 is such a low power that does not influence the demodulation from the signal c2 into the data B by the demodulator 111, the power P2 is not necessarily the same as the power P1 and may be higher than the power P1, for example. Although the signal B interfered by the signal a2 is referred to as the signal c2 for purposes of explanation, the power P2 for transmitting the signal a2 is such a low power that does not influence the demodulation from the signal c2 to the data B. Therefore, the signal B and the signal c2 are substantially the same.

In addition, as is the case with the signal c1, the signal c2 is also transmitted to the demodulator 111 and the interference reducing unit 113. As is the case with the signal c1, since the signal c2 transmitted to the demodulator 111 is only subjected to such low interference that does not influence the demodulation into the data B, the signal c2 is demodulated into the data B and the index indicative of the quality of the signal is calculated by the demodulator 111. The demodulated data B is modulated into the signal B0 in the controller 112 and the signal B0 is transmitted to the terminal 50 through the transmitter 102. Since the communication between the wireless communication device 100 and the terminal 50 is performed in a frequency band different from the frequency bands α and β, the power of the signal B0 is the power informed to the terminal 50.

Next, the interference reducing unit 113 estimates the interference propagation path characteristics $I_{A1}$ from the signal c2 transmitted from the receiver 101 and the information about the known symbols $P_R$ of the signal B and the known symbols $P_T$ of the signal a1 which have been recognized in advance (step S303). More specifically, since the timing for transmitting the symbol of the signal a2 is matched by the signal a1, the known symbols $P_R$ of the signal c2 which the receiver 102 receives are interfered by the known symbols $P_T$ of the signal a2. The interference reducing unit 113 estimates the interference propagation path characteristics $I_{A1}$ by subtracting the known symbols $P_R$ from the signal c2 and comparing the result of subtraction with the known symbols $P_T$.

The estimation of the interference propagation path characteristics $I_{A1}$ of step S201 is performed in the manner described above.

Now, the operation will be described with reference to FIG. 10A again. The controller 112 transmits to the interference reducing unit 113 the signal a3 to which resource elements $D_T$ including the data A are assigned. The interference reducing unit 113 generates the signal D for reducing interference from the interference propagation path characteristics $I_{A1}$ and the signal a3 (step S202). This interference is interference of the signal c3 which the receiver 101 receives in a case where the transmitter 102 starts transmission of the signal a3. Note that the controller 112 also transmits the signal a3 to the transmitter 102 and instructs the transmitter 102 to start transmission of the signal a3 in place of the signal a2.

Next, the transmitter 102 starts transmission of the signal a3 in place of the signal a2 according to the instruction of the controller 112 (step S203). At this time, the transmitter 102 starts transmission of the signal a3 at the same timing as the timing which is controlled at the transmission of the signal a2. As the transmitter 102 transmits the signal a3, the receiver 101 receives the signal c3. At this time, a power P3 for transmitting the signal a3 is such a low power that does not influence the demodulation from the signal c3 into the data B by the demodulator 111. As long as the power P3 is such a low power that does not influence the demodulation from the signal c3 into the data B by the demodulator 111, the power P3 is not necessarily the same as the power P1 or P2 and may be lower than the power P2, for example. Although the signal B is interfered by the signal a3 is referred to as the signal c3 for purposes of explanation, the power P3 at the time of starting transmission of the signal a3 is such a low power that does not influence the demodulation from the signal c3 into the data B. Therefore, the signal B and the signal c3 are substantially the same.

Next, the interference reducing unit 113 starts processing for reducing the interference of the signal a3 which the transmitter 102 transmits in the signal c3 which the receiver 101 receives by using the generated signal D (step S204). Even after the transmission is switched to the transmission of the signal a3, the demodulator 111 still receives the signal c3 which has been subjected to the interference reduction processing using the signal D, and modulates the signal c3 into the data B. Regarding the signal c3 subjected to the interference reduction processing using the signal D, the demodulator 111 calculates the index indicative of the quality of the signal and transmits the index to the controller 112. The controller 112 modulates the demodulated data B into the signal B0 and transmits the signal B0 to the terminal 50 through the transmitter 102.

Next, the interference reducing unit 113 starts update of the interference propagation path characteristics $I_{A1}$ (step S205). The update of the interference propagation path characteristics $I_{A1}$ is performed at particular time intervals. This particular time is set by the interference reducing unit 113. However, the update of the interference propagation path characteristics $I_{A1}$ may not be performed at the particular time intervals, and may be updated at an arbitrary timing set by the interference reducing unit 113. The update of the interference propagation path characteristics $I_{A1}$ is performed by using the signal a3. More specifically, the known symbols $P_R$ of the signal c3 which the receiver 102 receives are interfered by the known symbols $P_T$ of the signal a3. The interference reducing unit 113 subtracts the known symbols $P_R$ from the signal c2, compares the result of subtraction with the known symbols $P_T$, and thereby newly estimates the interference propagation path characteristics $I_{A1}$. At this time, the signal a3 may be temporarily switched to the signal a2 and the interference propagation path characteristics $I_{A1}$ may be newly estimated. The interference reducing unit 113 receives the signal a3 from the controller 112, and newly generates the signal D using the newly estimated interference propagation path characteristics $I_{A1}$. The interference reducing unit 113 switches the signal D to the newly generated signal D, and continues the processing for reducing the interference of the signal a3 which the transmitter 102 transmits in the signal c3 which the receiver 101 receives.

Next, the controller 112 determines whether the level of quality of the signal transmitted from the demodulator 111 is the particular level or higher based on the index indicative of the quality of the signal transmitted from the demodulator 111 (step S206). The level of quality of the signal is the level of quality of the signal c3 which has been subjected to the interference reduction processing using the signal D by the interference reducing unit 113. If the controller 112 determines that the level of quality of the signal is lower than the particular level (step S206: No), after the interference propagation path characteristics $I_{A1}$ are updated and the processing for reducing the interference of the signal a3 in the signal c3 processes, the flow returns to step S206.

On the other hand, if the controller 112 determines that the level of quality of the signal transmitted from the demodulator 111 is the particular level or higher, that is, such a level that does not influence the demodulation into the data B by the demodulator 111 (step S206: Yes), the controller 112 instructs the transmitter 102 to increase the power P3 for transmitting the signal a3. The transmitter 102 increases the power P3 for transmitting the signal a3 according to the instruction received from the controller (step S207).

Although the signal a3 includes the data A, since the original power at the start of transmission of the signal a3 is such a low power that does not influence the reception of the signal by the receiver 101 and the demodulation into the data B by the demodulator 111, there is a low probability of the data A being transmitted to the wireless communication device 200. Since the interference reducing unit 113 reduces the interference included in the signal c3 and the controller 112 increases the power P3 for transmitting the signal a3 at the timing when the controller 112 determines that the level of quality of the signal is the particular level or higher, the demodulation into the data B by the demodulator 111 can be secured and the probability of the data A being transmitted to the wireless communication device 200 can be increased.

In addition, since the power P3 for transmitting the signal a3 is increased in step S207, the power P3 for transmitting the signal a3 becomes such a power that influences the demodulation from the signal c3 into the data B, and the signal B and the signal c3 are substantially not the same.

Figure 10B:
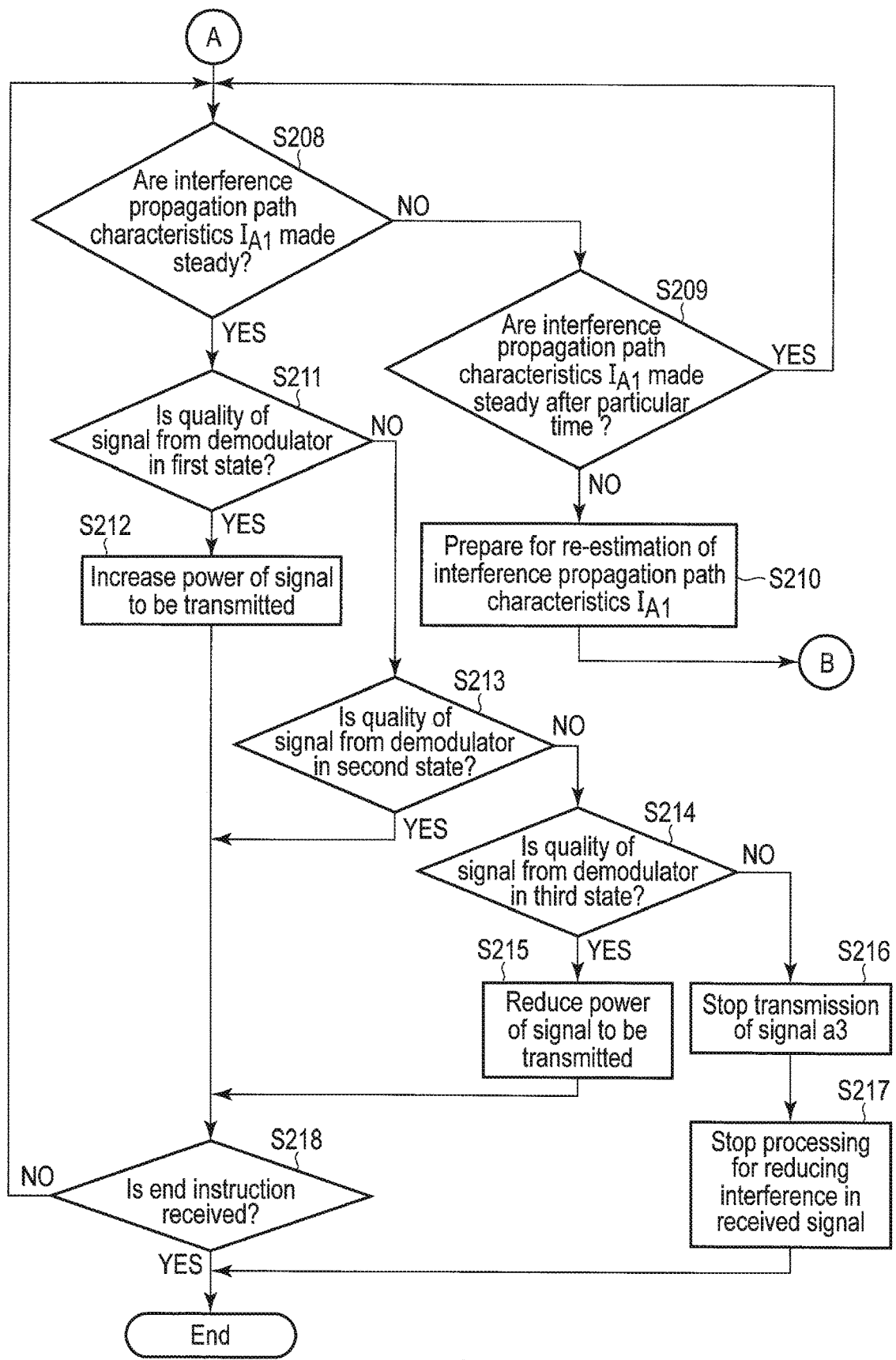
FIG. 10B are an exemplary diagrams showing the second half of the flow chart of the full-duplex communication of the wireless communication device 100 of FIG. 3.

Next, the interference reducing unit 113 determines whether the estimated interference propagation path characteristics $I_{A1}$ are made steady (step S208 in FIG. 10B). More specifically, the determination will be described with reference to FIG. 12.

Figure 12:
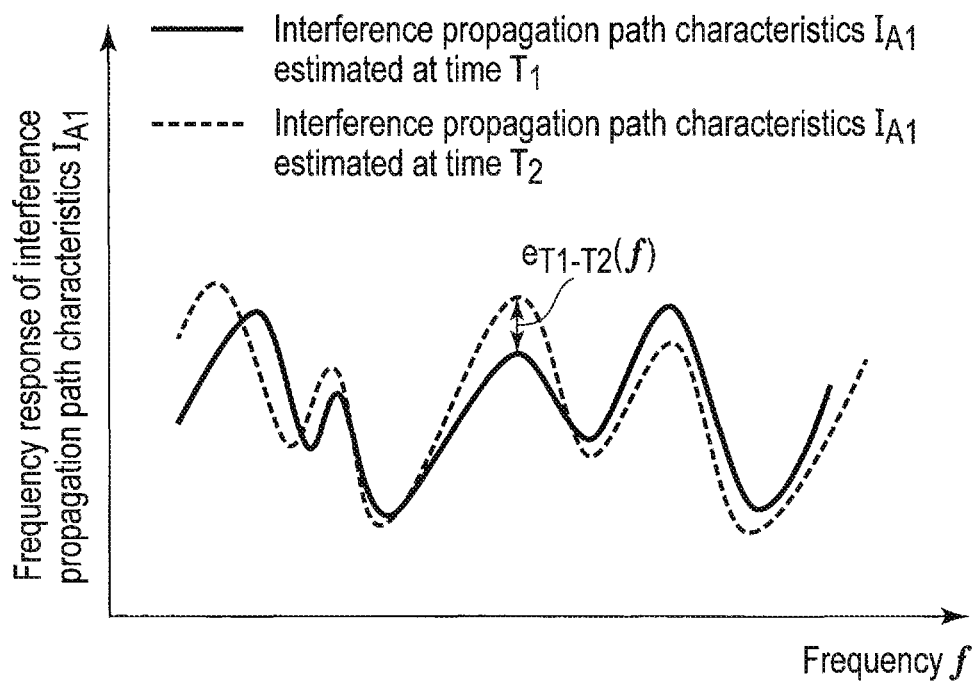
FIG. 12 is a diagram showing a frequency f and a frequency response of the interference propagation path characteristics $I_{A1}$ in the first embodiment.

A frequency response of the interference propagation path characteristics $I_{A1}$ with respect to a frequency f is shown in FIG. 12. The interference propagation path characteristics $I_{A1}$ estimated at a time $T_1$ is shown by a solid line, and the interference propagation path characteristics $I_{A1}$ estimated at a time $T_2$ is shown by a broken line. The interference propagation path characteristics $I_{A1}$ estimated at the time $T_2$ are those which were estimated most recently by the interference reducing unit 113, and the interference propagation path characteristics $I_{A1}$ estimated at the time $T_1$ are those which were estimated at a previous timing by the interference reducing unit 113. Note that the time between the time $T_1$ and the time $T_2$ is set by the interference reducing unit 113.

The interference reducing unit 113 calculates the difference between these two interference propagation characteristics $I_{A1}$ for each frequency band. The absolute value of the difference in a particular frequency band is represented as $e_{T1-T2}(f)$. The interference reducing unit 113 calculates $e_{T1-T2}(f)$ for each frequency band. The interference reducing unit 113 determines whether $e_{T1-T2}(f)$ is less than or equal to a threshold value set by the interference reducing unit 113 for each frequency band. If the number of the absolute values of frequency bands determined to be less than or equal to the threshold value is greater than or equal to a particular number set by the interference reducing unit 113, the interference reducing unit 113 determines that the interference propagation path characteristics $I_{A1}$ are made steady. The interference reducing unit 113 may determine that the interference propagation path characteristics $I_{A1}$ are made steady based on the ratio of the number of the absolute values of frequency bands determined to be less than or equal to the threshold value to the number of frequency bands used for full-duplex communication.

Based on the determination by the interference reducing unit 113 that the interference propagation path characteristics $I_{A1}$ are made steady, it is assumed that the reduction of the interference of the signal a3 in the signal c3 has been steadily performed.

Regarding the determination of whether the interference propagation path characteristics $I_{A1}$ are made steady, the threshold value can be determined in various manners. The interference reducing unit 113 calculates $e_{T1-T2}(f)$ for each frequency band, and may obtain the sum and compare the sum with a threshold value or may obtain the maximum value or average value of $e_{T1-T2}(f)$ and compare the maximum value or average value with a threshold value. In addition, it not necessary to compare two interference propagation path characteristics $I_{A1}$. It is possible to take three or more interference propagation path characteristics $I_{A1}$ into consideration. For example, the maximum frequency response of the interference propagation path characteristics $I_{A1}$ and the minimum frequency response of the interference propagation path characteristics $I_{A1}$ may be extracted and the difference may be obtained for each frequency band.

Now, the operation will be described with reference to FIG. 10B again. If the interference reducing unit 113 determines that the interference propagation path characteristics $I_{A1}$ are made steady (step S208: Yes), the flow proceeds to step S211. On the other hand, if the interference reducing unit 113 determines that the interference propagation path characteristics $I_{A1}$ are not made steady (step S208: No), the interference reducing unit 113 confirms whether the interference propagation path characteristics $I_{A1}$ is determined to be made steady after a particular time (step S209). If two interference propagation path characteristics $I_{A1}$ are not estimated within the particular time, it is determined that the interference propagation characteristics $I_{A1}$ are not made steady (step S208: No).

If the interference reducing unit 113 determines that the interference propagation path characteristics $I_{A1}$ are made steady within the particular time (step S209: Yes), after the interference propagation path characteristics $I_{A1}$ are updated, the flow returns to step S208 again. It is because, in a case where the interference propagation path characteristics $I_{A1}$ is made steady within the particular time, as the update of the interference propagation path characteristics $I_{A1}$ is continued, the interference propagation path characteristics $I_{A1}$ will eventually be made steady. A case where two interference propagation path characteristics $I_{A1}$ are not estimated within the particular time is also included in this case (step S209: Yes). It is because, if the update of the interference propagation path characteristics $I_{A1}$ is not performed, it is not possible to determine whether the interference propagation path characteristics $I_{A1}$ are made steady at step S208.

On the other hand, if the interference reducing unit 113 does not determine that the interference propagation path characteristics $I_{A1}$ are made steady within the particular time (step S209: No), the interference reducing unit 113 prepares for re-estimation of the interference propagation path characteristics $I_{A1}$ (step S210). More specifically, the interference reducing unit 113 stops the update of the interference propagation path characteristics $I_{A1}$. In addition, the interference reducing unit 113 transmits information about re-estimation of the interference propagation path characteristics $I_{A1}$ to the controller 112. The controller 112 which has received the information instructs the transmitter 102 to switch the transmission signal from the signal a3 to the signal a1 and to reduce the transmission power to the power P1 at the start of the transmission of the signal a1. According to the instruction of the controller 112, the transmitter 102 transmits the signal a1 while reducing the power to the power P1 at the start of full-duplex communication. Subsequently, the flow returns to step S201.

Next, the operation from step S208: Yes onward will be described. The controller 112 controls the power of the signal to be transmitted based on the index indicative of the quality of the signal transmitted from the demodulator 111 (steps S211 to S218). More specifically, the operation will be described with reference to FIG. 13.

Figure 13:
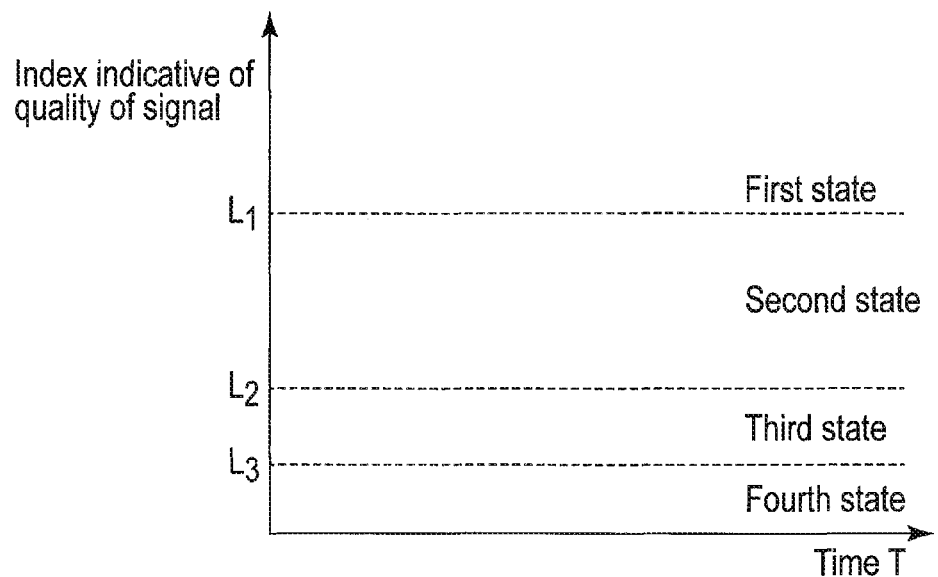
FIG. 13 is an exemplary diagram showing a relationship between a time T and an index indicative of a quality of a signal in the first embodiment.

FIG. 13 shows the relationship between the time T and the index indicative of the quality of the signal from demodulator (hereinafter referred to as the index). As the index, threshold values $L_1$, $L_2$, and $L_3$ are set by the controller 112. If the index is greater than or equal to the threshold value $L_1$, the controller 112 determines that the quality of the signal is in the first state. If the index is greater than or equal to the threshold value $L_2$ and less than the threshold value $L_1$, the controller 112 determines that the quality of the signal is in the second state. If the index is greater than or equal to the threshold value $L_3$ and less than the threshold value $L_2$, the controller 112 determines that the quality of the signal is in the third state. If the index is less than the threshold value $L_3$, the controller 112 determines that the quality of the signal is in the fourth state.

Now, the operation will be described with reference to FIG. 10B again. If the quality of the signal is in the first state (step S211: Yes), since the transmission signal a3 not influence the demodulation of the signal by the demodulator 111, the controller 112 instructs the transmitter 102 to increase the power P3 for transmitting the signal a3. Therefore, the transmitter 102 increases the power P3 and transmits the signal a3 according to the instruction of the controller 112 (step S212).

If the quality of the signal is in the second state (step S211: No and step S213: Yes), the controller 112 does not transmit the instruction related to the power P3 for transmitting the signal a3 to the transmitter 102. Therefore, the transmitter 102 maintains the current power P3 and continues the transmission of the signal a3.

If the quality of the signal is in the third state (step S213: No and step S214: Yes), since the transmission signal a3 is influencing the demodulation of the signal by the demodulator 111, the controller 112 instructs the transmitter 102 to reduce the power P3 for transmitting the signal a3. The transmitter 102 reduces the power P3 and transmits the signal a3 according to the instruction of the controller 112 (step S215).

If the quality of the signal is in the fourth state (step S214: No), since the transmission signal a3 is seriously influencing the demodulation of the signal by the demodulator 111, the controller 112 instructs the transmitter 102 to stop the transmission of the signal a3. The transmitter 102 stops the transmission of the signal a3 according to the instruction of the controller 112 (step S216). In addition, the controller 112 instructs the interference reducing unit 113 to stop the update of the interference propagation path characteristics $I_{A1}$ and the signal D and to stop the processing for reducing the interference of the signal a3 in the signal c3. According to the instruction from the controller 112, the interference reducing unit 113 stops the update of the interference propagation path characteristics $I_{A1}$ and the signal D and stops the processing for reducing the interference in the signal c3 (step S217).

The controller 112 controls the power of the signal to be transmitted based on the index indicative of the quality of the signal transmitted from the demodulator 111 in the manner described above. Here, although the quality of the signal is classified by state in the present embodiment, the method for controlling the power for transmitting the signal a3 is not limited to this method. The fewness of errors of the signal may be used as the index, or the threshold values may be segmented or integrated. The power for transmitting the signal a3 may be controlled in a case where the first state, the third state or the fourth state determined based on the index indicative of the quality of the signal continues for a particular time.

The operation from step S212, step S213: Yes, and step S215 onward will be described. The controller 112 confirms whether the controller 112 has received an end instruction to end the operation of the wireless communication device 100 (step S218). The end instruction is an instruction to end the operation of the wireless communication device 100 as the current flow ends, and is transmitted to the controller 112 when the user performs input or the receiver 101 receives a signal including the end instruction. The end instruction may be an instruction to immediately end the operation of the wireless communication device 100.

If the controller 112 has not received the end instruction (step S218: No), the flow returns to step S208. On the other hand, if the controller 112 has received the end instruction (step S218: Yes) or after step S217, the flow ends and the operation of the wireless communication device 100 ends.

Figure 14:
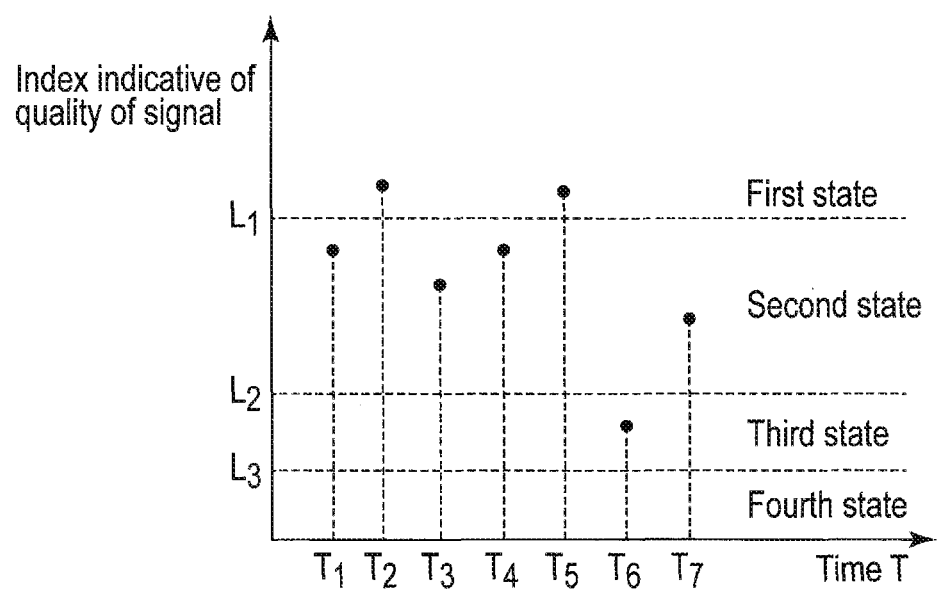
FIG. 14 is an exemplary diagram showing a relationship between the time T and the index indicative of the quality of the signal in the first embodiment.

An example of the control of the power P3 for transmitting the signal a3 by the controller 112 will be described with reference to FIG. 14. It is assumed that the interference propagation path characteristics $I_{A1}$ have been made steady and the end instruction is not issued between a time $T_1$ to a time $T_7$. It is also assumed that, since the update of the interference propagation path characteristics $I_{A1}$ has been started, the interference propagation path characteristics $I_{A1}$ and the signal D are also updated between the time $T_1$ and the time $T_7$.

First, at the time $T_1$, the controller 112 determines that the quality of the signal is in the second state. The transmitter 102 continues the transmission of the signal a3 while maintaining the power P3 for transmitting the signal a3. The interference in the signal c3 is continuously reduced by the interference reducing unit 113.

Next, at the time $T_2$, the controller 112 determines that the quality of the signal is in the first state. The controller 112 instructs the transmitter 102 to increase the power P3 for transmitting the signal a3. As the power P3 for transmitting the signal a3 is increased, the influence of the interference of the signal a3 in the signal c3 increases, accordingly. Therefore, the index indicative of the quality of the signal deteriorates.

At the following times $T_3$ and $T_4$, the controller 112 determines that the quality of the signal is in the second state. As the interference propagation path characteristics $I_{A1}$ and the signal D are updated, the index indicative of the quality of the signal improves.

Next, at the time $T_5$, the controller 112 determines that the quality of the signal is in the first state. As is the case with the time $T_2$, the controller 112 instructs the transmitter 102 to increase the power P3 for transmitting the signal a3.

At the time $T_6$, the controller 112 determines that the quality of the signal is in the third state. If the influence of the interference of the signal a3 in the signal c3 is increased as the power P3 for transmitting the signal a3 is increased and the interference is influencing the demodulation by the demodulator 111, the controller 112 instructs the transmitter 102 to reduce the power P3 for transmitting the signal a3. As the power P3 for transmitting the signal a3 is reduced, the influence of the interference of the signal a3 in the signal c3 decreases, accordingly. Therefore, the index indicative of the quality of the signal improves.

At the time $T_7$, the controller 112 determines that the quality of the signal is in the second state. Since the power P3 for transmitting the signal a3 was reduced, the index indicative of the quality of the signal has improved. Therefore, the controller 112 does not instruct the transmitter 102 to increase or reduce the power P3 for transmitting the signal a3.

The controller 112 controls the power P3 at which the transmitter 102 transmits the signal a3 in the manner described above.

While the present embodiment has been described above, the present embodiment can be implemented in various manners as modifications. For example, the system shown in FIG. 1 includes a single terminal 50, wireless communication device 100 and wireless communication device 200 but the system includes two or more terminals 50, wireless communication devices 100 and wireless communication devices 200. The wireless communication device 100 may communicate with a plurality of terminals 50, or the wireless communication device 200 may communicate with a plurality of wireless communication devices 100. Some or all communications between the wireless communication device 200 and wireless communication devices 100 may be full-duplex communication described in the present embodiment. The core network 250 may communicate with a plurality of wireless communication devices 200.

In addition, in the communication system of the wireless communication devices 100 and 200 shown in FIG. 2, although full-duplex communication is performed in the entire frequency band α used for the reception of the signal B, full-duplex communication may be performed in a part of the frequency band α. For example, in a case where the frequency band α can be segmented into a frequency bands $α_1$ and $α_2$, while the signal B is transmitted from the wireless communication device 200 to the wireless communication device 100 in the frequency bands $α_1$ and $α_2$, the wireless communication device 100 may transmit the signal A1 to the wireless communication device 200 in the frequency band a1 and perform full-duplex communication and may receive the signal B in the frequency band α2.

Furthermore, although the wireless communication devices 100 and 200 start full-duplex communication via the frequency band α in the present embodiment, the wireless communication devices 100 and 200 may further perform full-duplex communication via the frequency band β. For example, the wireless communication device 200 may be the same device as the wireless communication device 100. This wireless communication device 200 may start transmission of the signal $B_2$ in the frequency band β while continuing the reception of the signals A1 and A2 in the frequency bands α and β and the transmission of the signals A1 and A2 in the frequency band α. That is, the wireless communication devices 100 and 200 may start full-duplex communication in the frequency bands α and β. In this case, the operation of the wireless communication device 200 is the same as the operation of the wireless communication device 100 described in the present embodiment.

Furthermore, although full-duplex communication is performed in the communication system of the wireless communication devices 100 and 200 shown in FIG. 2 in the present embodiment, full-duplex communication is not necessarily performed between the wireless communication device 100 which is the base station and the wireless communication device 200 which is the relay station. For example, full-duplex communication may be performed between the terminal 50 and the wireless communication device 100 or full-duplex communication may be performed between the wireless communication device 200 and the core network 250 by the method described in the present embodiment.

In addition, although the wireless communication device 100 is assumed to be the base station and the wireless communication device 200 is assumed to be the relay station in the present embodiment, the present embodiment is not intended to limit the invention to this example. It is possible to perform the same operation as the wireless communication device 100 by providing a device having the function of the wireless communication device 100 described in the present embodiment. This device may be an external device or may be a built-in device.

Furthermore, according to the present embodiment, the wireless communication device 100 increases the probability of the signal A1 being transmitted to the wireless communication device 200 by increasing the power P1 for transmitting the signal A1. However, it is also possible to increase the probability of the signal A1 being to the wireless communication device 200 by selecting the type of the signal A1. For example, there are various Modulation and Coding Schemes (MCS) for signals. Generally, as the volume of data which the MCS of a signal can handle increases, the probability of a signal being transmitted to a transmission the destination wireless communication device decreases. The controller 112 may determine a MCS used for the signal B based on the data B and may use an MCS which handles less data than this MAC, for the signal A1. Consequently, it is possible to increase the probability of the signal A1 being transmitted to the wireless communication device 200.

Furthermore, according to the present embodiment, the wireless communication device 100 enhances the quality of the signal C (the signal B in a case where the wireless communication device 100 does not transmit the signal A1) by reducing the power P1 of the signal A1 to be transmitted or stopping the transmission of the signal A1. The controller 112 may generate a signal including an instruction to increase the power for transmitting the signal B with respect to the wireless communication device 200, and may instruct the transmitter 102 to transmit this signal including the instruction. At this time, the controller 112 may instruct the transmitter 102 to transmit this signal in a frequency band which is not used for full-duplex communication. For example, the controller 112 may instruct the transmitter 102 to transmit this signal in the frequency band β in the present embodiment. The wireless communication device 200 which received this signal increases the power for transmitting the signal B. Consequently, the receiver 101 can receive the signal B or C more easily and the demodulator 111 can modulate the signal B or C into the data B more easily.

Figure 11:
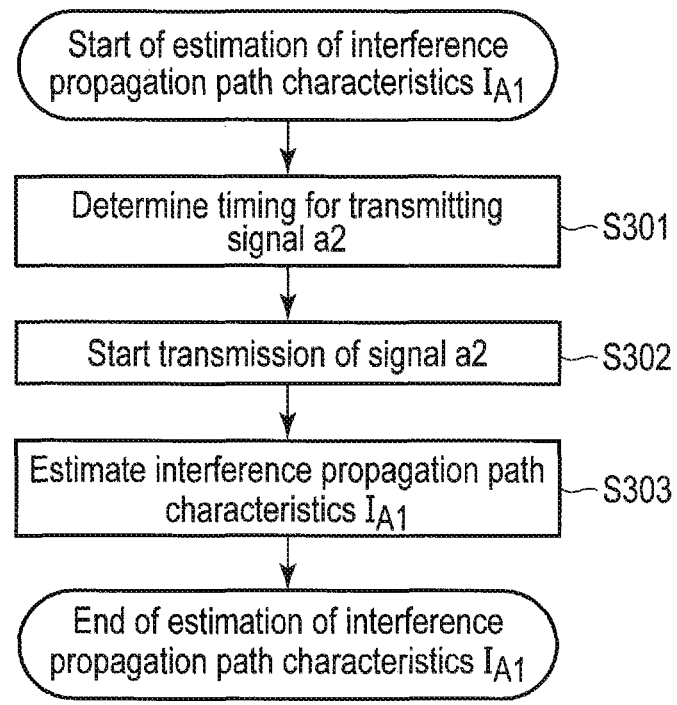
FIG. 11 is an exemplary diagram showing a flowchart of estimation of interference propagation path characteristics $I_{A1}$ of the wireless communication device 100 of FIG. 3.

Furthermore, the method for estimating the interference propagation path characteristics $I_{A1}$ is not limited to the method shown in FIG. 11 described in the present embodiment. For example, although the interference propagation path characteristics $I_{A1}$ are estimated by using the signals a1 and a2 in the method described in the present embodiment, the interference propagation path characteristics $I_{A1}$ may be estimated by using a signal a4 instead of these signals a1 and a2.

Figure 15:
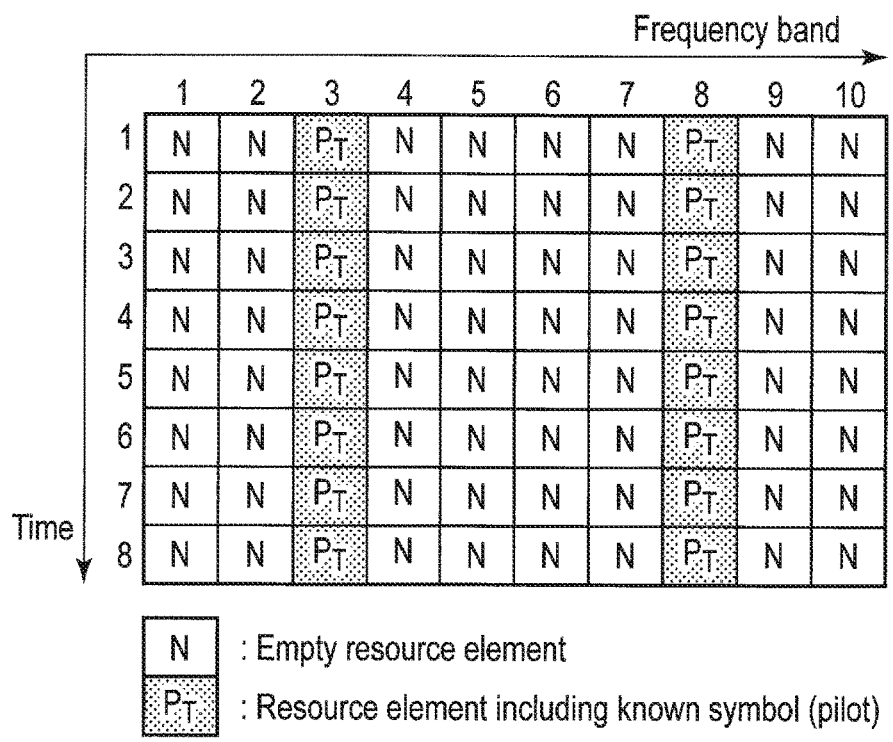
FIG. 15 is an exemplary diagram showing a structure of a signal a4 applicable to the first embodiment.

The structure diagram of the signal a4 is shown in FIG. 15. In the signal a4, since the known symbols $P_T$ are assigned to the resource elements of specific frequency bands, the interference propagation path characteristics $I_{A1}$ can be estimated without the timing control. On the other hand, in the method described in the present embodiment, the interference propagation path characteristics $I_{A1}$ can be more accurately estimated not only in a specific frequency band but also in a frequency band used for full-duplex communication by the signal a2 and the signal c2.

Figure 16:
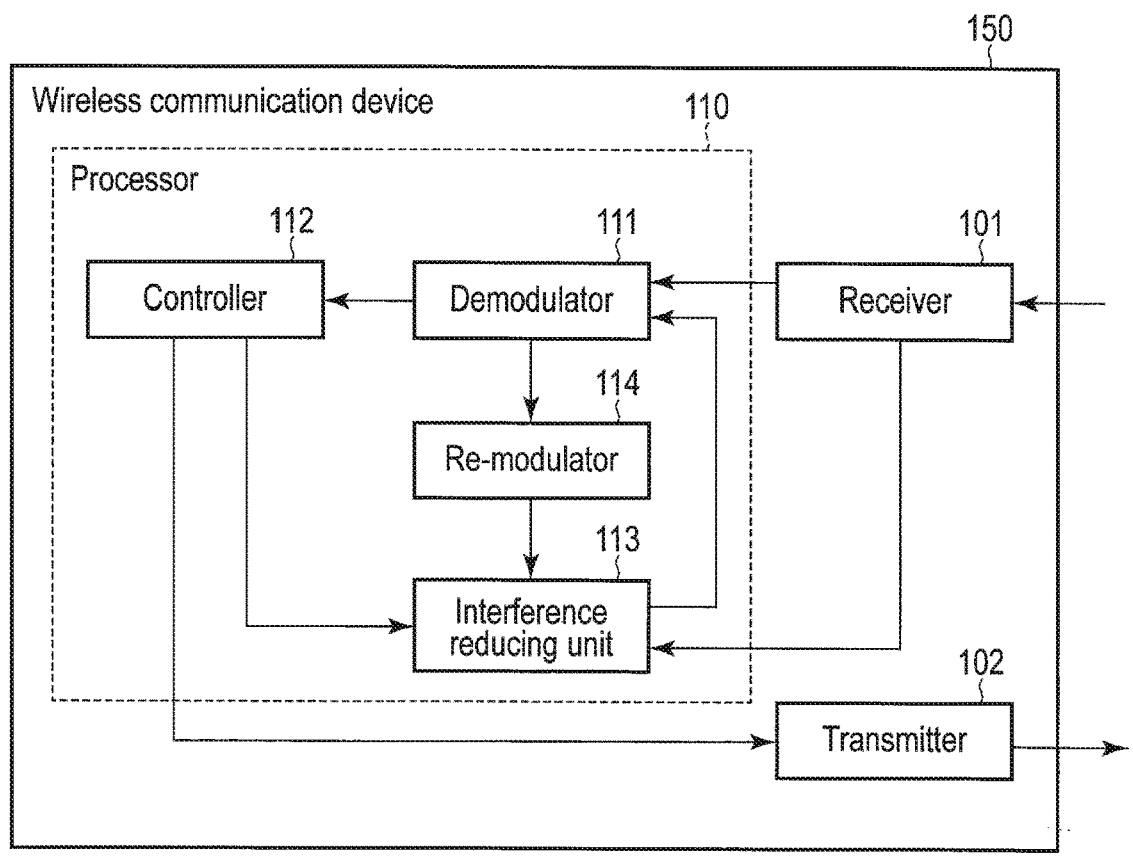
FIG. 16 is an exemplary diagram showing a configuration of a wireless communication device 150 applicable to the first embodiment.

As the method for estimating the interference propagation path characteristics $I_{A1}$, it is also possible to create a replica of the signal B transmitted from the wireless communication device 200. In this case, the wireless communication device 100 is a wireless communication device which further comprises a re-modulator 114 in the processor 110. The configuration of this wireless communication device 150 is shown in FIG. 16. Since the constituent elements other than the re-modulator 114 of the wireless communication device 150 are the same as those of the wireless communication device 100 described with reference to FIG. 3, and the constituent elements will be denoted by the same reference numbers and will not be described in detail. Different portions from the constituent elements of the wireless communication device 100 described with reference to FIG. 3 will be described below.

First, although the signals a1 and a2 are used for the estimation of the interference propagation path characteristics $I_{A1}$ in the present embodiment, the signal a3 can be used from the beginning in the estimation method by creating a replica of the signal B. Although the signals a1 and a2 can be used, the case of using the signal a3 will be described below. That is, the receiver 101 of the wireless communication device 150 receives the signal c3. The power for transmitting the signal a3 is assumed to be the power P3 as is the case with the present embodiment.

The demodulator 111 of the wireless communication device 150 transmits the demodulated data B not to the interference reducing unit 113 but to the re-modulator 114. The demodulated data B is used for generating the replica of the signal B.

The re-modulator 114 re-modulates the data B transmitted from the modulator 111 into the signal B and thereby generates the replica of the signal B. The replica of the signal B is transmitted to the interference reducing unit 113 and is used for estimation of the interference propagation path characteristics $I_{A1}$.

The interference reducing unit 113 of the wireless communication device 150 estimates the interference propagation path characteristics $I_{A1}$ using the signal c3 transmitted from the receiver 101, the replica of the signal B transmitted from the re-modulator 114, and the signal a3 transmitted from the controller 112.

Figure 17:
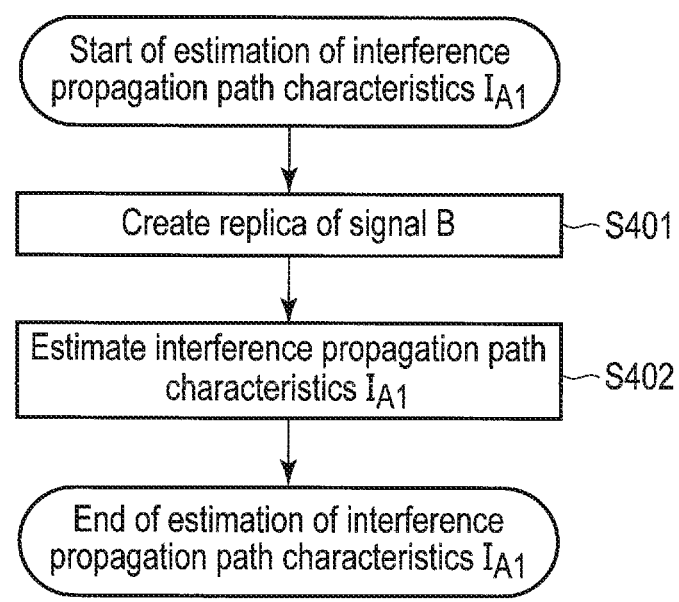
FIG. 17 is an exemplary diagram showing a flowchart of estimation of interference propagation pat characteristics $I_{A1}$ using a replica of the wireless communication device 150 of FIG. 16.

Although the operation of the wireless communication device 150 is generally the same as the operation of the wireless communication device 100 described with reference to FIGS. 9, 10A, and 10B, since the signals a1 and a2 are not used here, the operation of the wireless communication device 150 differs from the operation of the wireless communication device 100 in that the signal a3 is transmitted from the beginning. In addition, there is a difference between the method for estimation of the interference propagation path characteristics $I_{A1}$ of the wireless communication device 150 and the method for estimation of the interference propagation path characteristics $I_{A1}$ described with reference to FIG. 11. The method for estimating the interference propagation path characteristics $I_{A1}$ by the wireless communication device 150 will be described with reference to FIG. 17. Note that preconditions are the same as those of the operation of the wireless communication device 100.

First, the re-modulator 114 re-modulates the signal B from the data B transmitted from the demodulator 111 and generates the replica of the signal B (step S401). The replica of the signal B is transmitted to the interference reducing unit 113. Note that the signal c3 and the signal a3 are also transmitted to the interference reducing unit 113 respectively from the receiver 101 and the controller 112.

Next, the interference reducing unit 113 estimates the interference propagation path characteristics $I_{A1}$ from the replica of the signal B, the signal a3, and the signal c3 (step S402). More specifically, the interference propagation path characteristics $I_{A1}$ are estimated by subtracting the replica of the signal B from the signal c3 and comparing the result of subtraction with the signal a3. Since the interference reducing unit 113 has determined not only the information about the known symbols $P_R$ of the signal B but also the information about the resource elements $D_R$ including the data of the signal B from the generation of the replica of the signal B, the interference reducing unit 113 can estimate the interference propagation path characteristics $I_{A1}$.

The interference propagation path characteristics $I_{A1}$ are estimated by using the replica of the signal B in the manner described above.

According to the present embodiment, the interference reducing unit 113 estimates the interference propagation path characteristics $I_{A1}$ using the signal a2, and after switching the transmission signal from the signal a2 to the signal a3, the interference reducing unit 113 reduces the interference of the signal a3 in the signal c3. The interference reducing unit 113 may reduce the interference of the signal a2 in the signal c2 while transmitting the signal a2. If the quality of the signal demodulated by the demodulator 111 reaches the particular level or higher before the transmitter 102 switches the transmission signal from the signal a2 to the signal a3, the controller 112 may increase the power P2 for transmitting the signal a2. As the power P2 is increased, the influence of the interference of the signal a2 in the signal c2 increases, accordingly, and the signal B and the signal c2 are not substantially the same. In a case where the transmitter 102 switches the transmission signal from the signal a2 to the signal a3 in this state, the power P3 for transmitting the signal a3 may be higher than or equal to the power P2. It is because the quality of the signal demodulated by the demodulator 111 is considered to be such a high level that the power P2 can be increased while the transmitter 102 is transmitting the signal a2. In addition, since the power P3 is higher than or equal to the power P2 in this case, the influence of the interference of the signal a3 in the signal c3 is high, and the signal B and the signal c3 are not substantially the same.

The function of the wireless communication device 100 in the present embodiment can also be realized by a program. It is possible to provide the program by storing the program in a non-transitory computer-readable storage medium such as a CD-ROM, a memory card, a CD-R or a digital versatile disk (DVD) in a file in an installable or executable format. Alternatively, it is possible to store the program on a computer connected to a network such as the Internet and provide the program via the network, or to provide the program by incorporating the program in a storage medium such as a ROM, an HDD, or an SSD.

As described above, the wireless communication device 100 of the present embodiment starts transmission of a signal via a frequency band used for reception of a signal while performing Frequency Division Duplex communication with the wireless communication device 200, and thereby starts full-duplex communication. The wireless communication device 100 estimates interference propagation path characteristics $I_{A1}$ after starting the full-duplex communication, and reduces the interference of the signal which the wireless communication device 100 has transmitted in the received signal. The wireless communication device 100 increases a power for transmitting the signal before the interference propagation path characteristics $I_{A1}$ are made steady, and after the interference propagation path characteristics $I_{A1}$ are made steady, the wireless communication device 100 controls the power for transmitting the signal based on the quality of the signal to be demodulated. Consequently, the wireless communication device 100 can start, while receiving the signal, full-duplex communication via the same frequency band used for the reception of the signal. Furthermore, the wireless communication device 100 can start full-duplex communication even without estimating the interference propagation path characteristics of the interference of the signal which the wireless communication device 100 transmits in advance.

While certain embodiments have been described, these embodiments have been presented by way of example only, and are not intended to limit the scope of the inventions. Indeed, the novel embodiments described herein may be embodied in a variety of other forms; furthermore, various omissions, substitutions, and changes in the form of the embodiments described herein may be made without departing from the spirit of the inventions. The accompanying claims and their equivalents are intended to cover such forms or modifications as would fall within the scope and spirt of the inventions.

What is claimed is:

1. An electronic apparatus comprising:
receiver circuitry configured to receive a first signal including first data via a first frequency band;
transmitter circuitry configured to start transmission of a second signal via at least a part of the first frequency band while the receiver circuitry is receiving the first signal; and
processor circuitry configured to:
start processing for reducing interference in the first signal caused by the second signal, and
increase a transmission power of the second signal after starting the processing for reducing the interference until a reduction in the interference caused by the processing for reducing the interference becomes stable for a first time since the transmitter circuitry started transmission of the second signal.

2. The electronic apparatus of claim 1, wherein:
the second signal includes second data and known symbols,
the processor circuitry is configured to estimate interference propagation path characteristics based on at least the first signal and the second signal, and
the processor circuitry is configured to generate a third signal which reduces the interference based on at least the interference propagation path characteristics and the second signal, and subtract the third signal from the first signal.

3. The electronic apparatus of claim 2, wherein the processor circuitry is configured to increase the transmission power of the second signal until the interference propagation path characteristics become steady for a first time since the transmitter circuitry started transmission of the second signal.

4. The electronic apparatus of claim 2, wherein the processor circuitry is configured to increase the transmission power of the second signal until a calculated difference between two consecutively estimated interference propagation path characteristics becomes less than a predetermined value.

5. The electronic apparatus of claim 1, wherein:
the second signal includes a fourth signal not including data but including known symbols,
the processor circuitry is configured to estimate interference propagation path characteristics based on at least the first signal and the fourth signal, and
the processor circuitry is configured to generate a third signal which reduces the interference based on at least the interference propagation path characteristics, and subtract the third signal from the first signal.

6. The electronic apparatus of claim 5, wherein:
the second signal includes a fifth signal not including data but including a smaller number of known symbols than a number of known symbols in the first signal, and
the processor circuitry is configured to determine a timing for transmitting the fourth signal based on at least the first signal and the fifth signal.

7. The electronic apparatus of claim 1, further comprising re-modulator circuitry configured to create a replica of a signal which a wireless communication device that communicates with the electronic apparatus has transmitted via the first frequency band,
wherein:
the processor circuitry is configured to estimate interference propagation path characteristics based on the replica, the first signal, and the second signal, and
the processor circuitry is configured to generate a signal which reduces the interference based on at least the interference propagation path characteristics.

8. The electronic apparatus of claim 1, wherein the processor circuitry is configured to generate the second signal using a modulation and coding scheme (MCS) which handles less data than an MCS of the first signal.

9. The electronic apparatus of claim 1, wherein:
the processor circuitry is configured to generate a sixth signal including an instruction to increase a transmission power of a signal which a wireless communication device that communicates with the electronic apparatus transmits via the first frequency band, and the transmitter circuitry is configured to transmit the sixth signal via a second frequency band different from the first frequency band to the wireless communication device.

10. The electronic apparatus of claim 1, wherein the processor circuitry is configured to determine a quality of the first signal based on at least one of a cyclic redundancy check (CRC), a signal to noise ratio (SNR), and an error vector magnitude (EVM).

11. The electronic apparatus of claim 10, wherein the processor circuitry is configured to select one of increasing, maintaining, and reducing of the transmission power of the second signal, or stopping of transmission of the second signal, based on the quality of the first signal.

12. The electronic apparatus of claim 1, wherein the processor circuitry is configured to increase the transmission power of the second signal until a calculated difference between two consecutively measured amounts of the reduction in the interference caused by the processing for reducing the interference becomes less than a predetermined value.

13. A method of controlling communication by an electronic apparatus, the method comprising:
receiving a first signal including first data via a first frequency band;
starting transmission of a second signal via at least a part of the first frequency band while receiving the first signal;
starting processing for reducing interference in the first signal caused by the second signal; and
increasing a transmission power of the second signal after starting the processing for reducing the interference until a reduction in the interference caused by the processing for reducing the interference becomes stable for a first time since the starting the transmission of the second signal.

14. The method of claim 13, wherein the second signal includes second data and known symbols, and the method further comprises:
estimating interference propagation path characteristics based on at least the first signal and the second signal;
generating a third signal which reduces the interference based on at least the interference propagation path characteristics and the second signal; and
subtracting the third signal from the first signal.

15. The method of claim 14, wherein the increasing the transmission power comprises increasing the transmission power of the second signal until the interference propagation path characteristics become steady for a first time since the starting the transmission of the second signal.

16. The method of claim 13, wherein the second signal includes a fourth signal not including data but including known symbols, and the method further comprises:
estimating interference propagation path characteristics based on at least the first signal and the fourth signal;
generating a third signal which reduces the interference based on at least from the interference propagation path characteristics; and
subtracting the third signal from the first signal.

17. The method of claim 16, wherein the second signal include a fifth signal not including data but including a smaller number of known symbols than a number of known symbols in the first signal, and the method further comprises:
determining a timing for transmitting the fourth signal based on at least the first signal and the fifth signal.

18. The method of claim 13, further comprising:
creating a replica of a signal which a wireless communication device that communicates with the electronic apparatus has transmitted via the first frequency band;
estimating interference propagation path characteristics based on the replica, the first signal, and the second signal; and
generating a signal which reduces the interference based on at least the interference propagation path characteristics.

19. The method of claim 13, the second signal being generated using a modulation and coding scheme (MCS) which handles less data than an MCS of the first signal.

20. The method of claim 13, further comprising:
generating a sixth signal including an instruction to increase a transmission power of a signal which a wireless communication device that communicates with the electronic apparatus transmits via the first frequency band; and
transmitting the sixth signal via a second frequency band different from the first frequency band to the wireless communication device.

21. The method of claim 13, further comprising:
determining a quality of the first signal based on at least one of a cyclic redundancy check (CRC), a signal to noise ratio (SNR), and an error vector magnitude (EVM).

22. The method of claim 21, further comprising:
selecting one of increasing, maintaining, and reducing of the transmission power of the second signal, or stopping of transmission of the second signal, based on the quality of the first signal.

* * * * *